(12) United States Patent
Yang

(10) Patent No.: US 12,499,927 B2
(45) Date of Patent: Dec. 16, 2025

(54) MEMORY DEVICE WITH RECEIVER CIRCUIT TO SUPPRESS NOISE ON DATA STROBE SIGNALS

(71) Applicant: NANYA TECHNOLOGY CORPORATION, New Taipei (TW)

(72) Inventor: Wu-Der Yang, Taoyuan (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 38 days.

(21) Appl. No.: 18/395,798

(22) Filed: Dec. 26, 2023

(65) Prior Publication Data

US 2025/0210089 A1 Jun. 26, 2025

(51) Int. Cl.
| G11C 11/4076 | (2006.01) |
| G11C 7/10 | (2006.01) |
| G11C 11/16 | (2006.01) |
| G11C 11/4096 | (2006.01) |

(52) U.S. Cl.
CPC ........ *G11C 11/4076* (2013.01); *G11C 7/1063* (2013.01); *G11C 11/1693* (2013.01); *G11C 7/1039* (2013.01); *G11C 7/1072* (2013.01); *G11C 11/4096* (2013.01)

(58) Field of Classification Search
CPC .................. G11C 11/4096; G11C 11/4076
See application file for complete search history.

(56) References Cited

U.S. PATENT DOCUMENTS

| 6,016,066 A * | 1/2000 | Ilkbahar | G11C 7/1078 327/23 |
| 6,600,681 B1 | 7/2003 | Korger et al. | |
| 7,782,685 B2 * | 8/2010 | Kim | G11C 29/48 365/189.02 |
| 2005/0134314 A1 * | 6/2005 | Prather | H03K 19/018528 326/86 |
| 2009/0257294 A1 * | 10/2009 | Searles | G06F 13/4243 330/253 |

(Continued)

FOREIGN PATENT DOCUMENTS

| CN | 1783028 A | 6/2006 |
| CN | 112309451 A | 2/2021 |
| TW | 200915320 A | 4/2009 |

OTHER PUBLICATIONS

Office Action and and the search report mailed on Jan. 21, 2025 related to Taiwanese Application No. 113106122.

(Continued)

*Primary Examiner* — Mushfique Siddique
(74) *Attorney, Agent, or Firm* — Xuan Zhang

(57) ABSTRACT

A method for controlling data strobe signals for use in a memory device is provided. The memory device includes a receiver circuit having a differential amplifier, an auxiliary control circuit, and a data strobe control circuit. The method includes the following steps: utilizing the differential amplifier to amplify a first data strobe signal and a second data strobe signal received from a memory controller to generate a third data strobe signal and a fourth data strobe signal; utilizing the auxiliary control circuit to generate a disable control signal using the first data strobe signal and the second data strobe signal; and disabling the data strobe control circuit in response to the disable control signal being in a high logic state.

14 Claims, 17 Drawing Sheets

(56) References Cited

U.S. PATENT DOCUMENTS

| | | | |
|---|---|---|---|
| 2011/0002180 A1* | 1/2011 | Song | G11C 7/1066 |
| | | | 365/194 |
| 2011/0292739 A1* | 12/2011 | Song | G11C 7/1093 |
| | | | 365/189.05 |
| 2012/0269296 A1* | 10/2012 | Chuang | H03F 3/45179 |
| | | | 375/316 |
| 2018/0350442 A1 | 12/2018 | Koo | |
| 2023/0395106 A1* | 12/2023 | Lin | G11C 7/1084 |

OTHER PUBLICATIONS

Office Action and and the search report mailed on Jan. 24, 2025 related to Taiwanese Application No. 113121823.

Summary translation of Office Action and and the search report mailed on Jan. 21, 2025 related to Taiwanese Application No. 113106122 and Jan. 24, 2025 related to Taiwanese Application No. 113121823.

Office Action and and the search report mailed on Jul. 21, 2025 related to U.S. Appl. No. 18/413,386.

* cited by examiner

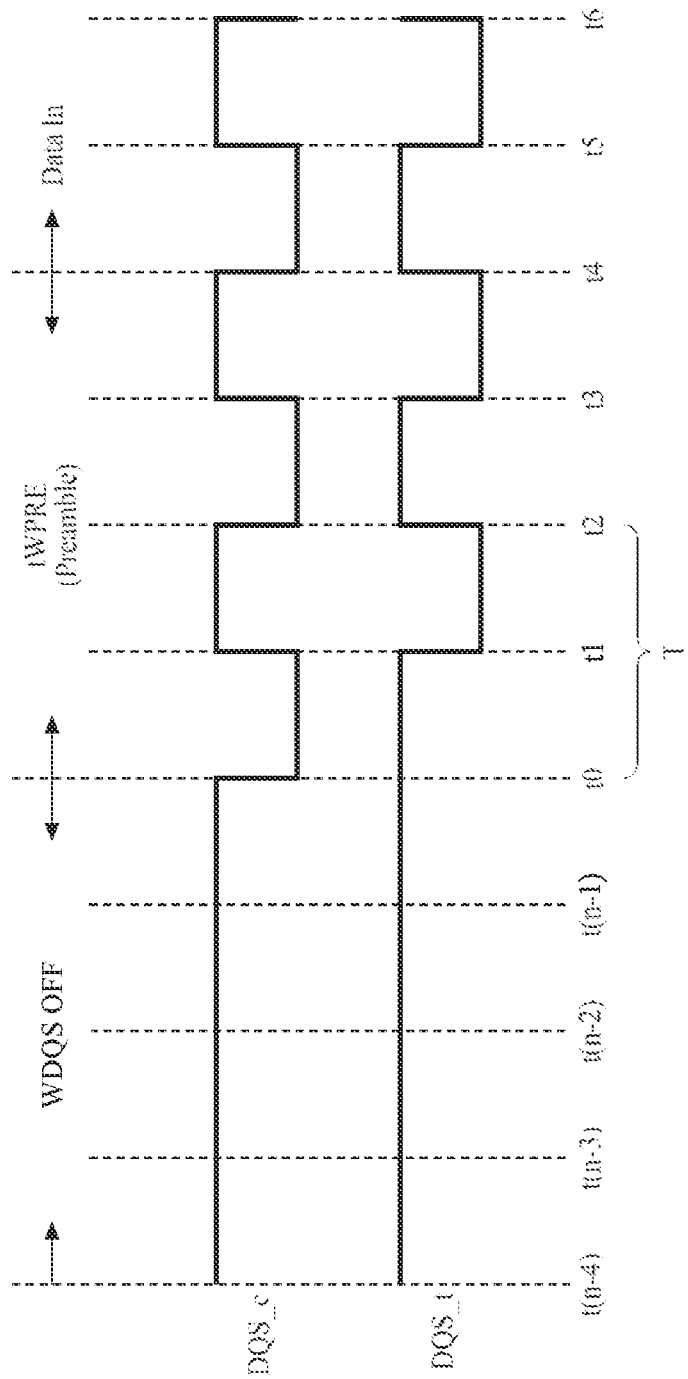

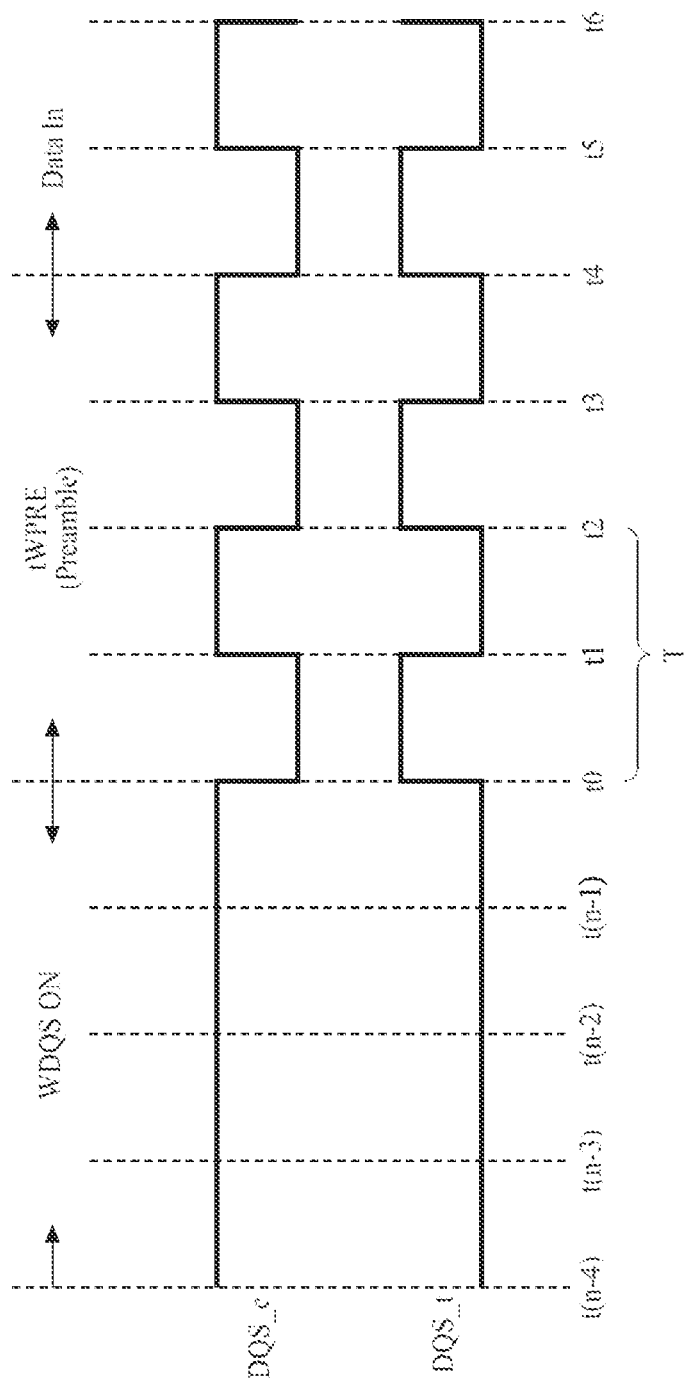

US 12,499,927 B2

MEMORY DEVICE WITH RECEIVER CIRCUIT TO SUPPRESS NOISE ON DATA STROBE SIGNALS

TECHNICAL FIELD

The present disclosure relates to electronic circuits, and more particularly, to a method for controlling data strobe signals and a memory device using the same.

DISCUSSION OF THE BACKGROUND

An LPDDR4 (Low-power Double Data Rate 4) memory is the mobile equivalent of a DDR4 (Double Data Rate 4) memory. A memory controller can control data access of an LPDDR4 memory via command control signals, data signals, and data strobe signals. However, when a write data strobe (WDQS) function of the memory controller is turned off, the logic states of the data strobe signals from the memory controller may be affected by the noises thereon since the noises are amplified by the differential amplifier in the receiver circuit of the LPDDR4 memory, leading to malfunctions or failures of the control circuit of the LPDDR4 memory. Accordingly, there is a demand for a method for controlling data strobe signals and a memory device using the same to solve the aforementioned problem.

This Discussion of the Background section is provided for background information only. The statements in this Discussion of the Background are not an admission that the subject matter disclosed herein constitutes prior art with respect to the present disclosure, and no part of this Discussion of the Background may be used as an admission that any part of this application constitutes prior art with respect to the present disclosure.

SUMMARY

One aspect of the present disclosure provides a memory device. The memory device includes a memory cell array, a control circuit, and an interface circuit. The control circuit is configured to control data access of the memory cell array. The receiver circuit is configured to receive a first data strobe signal and a second data strobe signal from a memory controller. The receiver circuit includes a differential amplifier, an auxiliary control circuit, and a data strobe control circuit. The differential amplifier is configured to amplify the first data strobe signal and the second data strobe signal to generate a third data strobe signal and a fourth data strobe signal. The auxiliary control circuit is configured to generate a disable control signal using the first data strobe signal and the second data strobe signal. The data strobe control circuit is configured to generate a first output data strobe signal and a second output data strobe signal according to the disable control signal, the third data strobe signal, and the fourth data strobe signal.

Another aspect of the present disclosure provides a memory device. The memory device includes a memory cell array, a control circuit, and an interface circuit. The control circuit is configured to control data access of the memory cell array. The receiver circuit is configured to receive a first data strobe signal and a second data strobe signal from a memory controller. The receiver circuit includes a differential amplifier, an auxiliary control circuit, and a data strobe control circuit. The differential amplifier is configured to amplify the first data strobe signal and the second data strobe signal to generate a third data strobe signal and a fourth data strobe signal. The auxiliary control circuit is configured to generate a disable control signal using a fifth data strobe signal and a sixth data strobe signal generated from the first data strobe signal and the second data strobe signal, respectively. The data strobe control circuit is configured to generate a first output data strobe signal and a second output data strobe signal according to the disable control signal, the third data strobe signal, and the fourth data strobe signal.

Yet another aspect of the present disclosure provides a method for controlling data strobe signals for use in a memory device. The memory device includes a receiver circuit having a differential amplifier, an auxiliary control circuit, and a data strobe control circuit. The method includes the following steps: utilizing the differential amplifier to amplify a first data strobe signal and a second data strobe signal received from a memory controller to generate a third data strobe signal and a fourth data strobe signal; utilizing the auxiliary control circuit to generate a disable control signal using the first data strobe signal and the second data strobe signal; and disabling the data strobe control circuit in response to the disable control signal being in a high logic state.

The foregoing outlines rather broadly the features and technical advantages of the present disclosure so that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

FIGS. 3A-3F are waveform diagrams of the data strobe signals during a write operation in accordance with an embodiment of the present disclosure.

DETAILED DESCRIPTION

Figure 1:
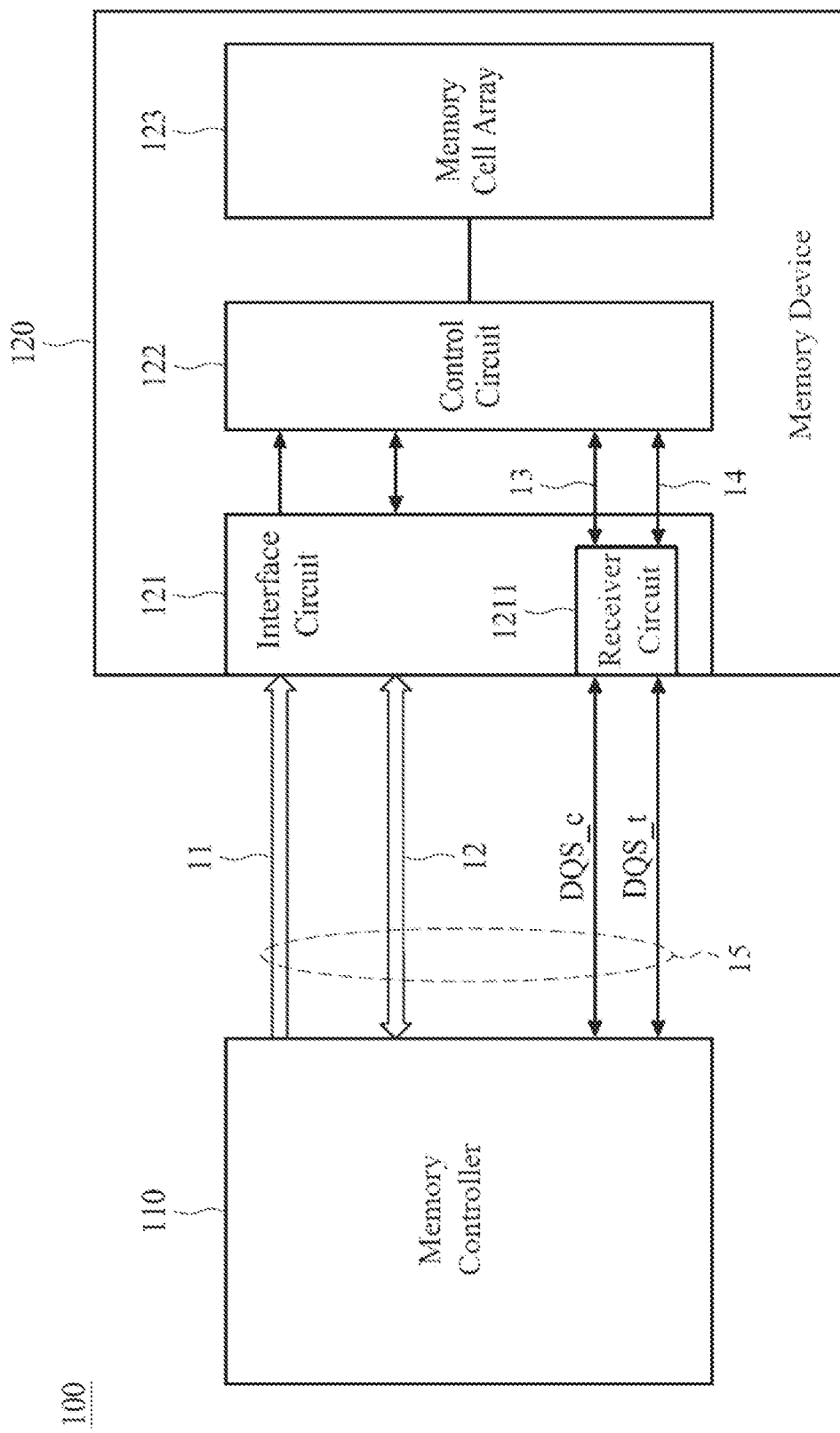
FIG. 1 is a block diagram of an electronic device 100 in accordance with an embodiment of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc., may be used herein to describe various elements, components, regions, layers or sections, these elements, components, regions, layers or sections are not limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (for example, rotated 90° or at other orientations) and the spatially relative descriptors used herein interpreted accordingly. In addition, it will also be understood that when a layer is referred to as being "between" two layers, it can be the only layer between the two layers, or one or more intervening layers may also be present.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

It will be understood that when an element or layer is referred to as being "formed on," another element or layer, it can be directly or indirectly formed on the other element or layer. That is, for example, intervening elements or layers may be present. In contrast, when an element or layer is referred to as being "directly formed on," another element, there are no intervening elements or layers present. Other words used to describe the relationship between elements or layers should be interpreted in a like fashion (e.g., "between," versus "directly between," "adjacent," versus "directly adjacent," etc.).

FIG. 1 is a block diagram of an electronic device 100 in accordance with an embodiment of the present disclosure.

In some embodiments, the electronic device 100 may include a memory controller 110 and a memory device 120, as depicted in FIG. 1. The memory controller 110 may be implemented by a central processing unit (CPU), a microprocessor, a digital signal processor, a field-programmable gate arrays (FPGA), an application-specific integrated circuit (ASIC), or a radio-frequency integrated circuit (RFIC).

In some embodiments, the memory device 120 may be a dynamic random access memory (DRAM). In other embodiments, other types of memories can be used. For purposes of description, this disclosure may focus on double-date rate synchronous dynamic random access memory (DDR SDRAM) such as LPDDR4, but the scope of embodiments is not limited to any particular memory technology or standard.

In some embodiments, the memory device 120 may include an interface circuit 121, a control circuit 122, and a memory cell array 123. The interface circuit 121 may be configured to transmit and receive data signals 12 over bus 15, and to receive command control signals 11 and data strobe signals DQS_c and DQS_t from the memory controller 110 over bus 15. In other words, the interface circuit 121 may include TX circuits (not explicitly shown) for the data signals 12, and RX circuits (not explicitly shown) for the command control signals 11, data signals 12, and data strobe signals DQS_c and DQS_t.

In some embodiments, the data strobe signal DQS_c may be a complementary signal of the data strobe signal DQS_t. For example, when the data strobe signal DQS_t is in the high logic state (e.g., 1), the data strobe signal DQS_c is in the low logic state (e.g., 0). When the data strobe signal DQS_t is in the low logic state (e.g., 0), the data strobe signal DQS_c is in the high logic state (e.g., 1). In some embodiments, the logic states of the data strobe signals DQS_t and DQS_c may be the same if a write data strobe (WDQS) function of the memory controller 110 is not enabled or not properly implemented.

In some embodiments, the RX circuits for the data strobe signals DQS_c and DQS_t can be referred to as a receiver circuit 1211 shown in FIG. 1. The receiver circuit 1211 may be configured to correct the data strobe signals DQS_c and DQS_t with inappropriate logic states and/or timing to generate data strobe signals 13 and 14. The data strobe signals 13 and 14 may be data strobe signals (e.g., *DQS_c and *DQS_t) with corrected logic states complying with the LPDDR4 standard defined by JEDEC Solid State Technology Association (i.e., abbreviated as JEDEC).

In some embodiments, the control circuit 122 may perform a read operation or a write operation according to the command control signals 11 and the data strobe signals 13 and 14. For example, during a write operation, the memory device 120 may receive a write command (e.g., including command control signal 11 and data signals 12) from the memory controller 110 over bus 15, and the control circuit 122 may then store the received data in the memory cell array 123. During a read operation, the memory device 120 may receive a read command signal (e.g., command control signal 11) from the memory controller 110 over bus 15, and the control circuit 122 may then access the data from various memory cells of the memory cell array 123, and transmit those bits of data (e.g., data signals 12) to the memory controller 110 over bus 15.

Figure 2:
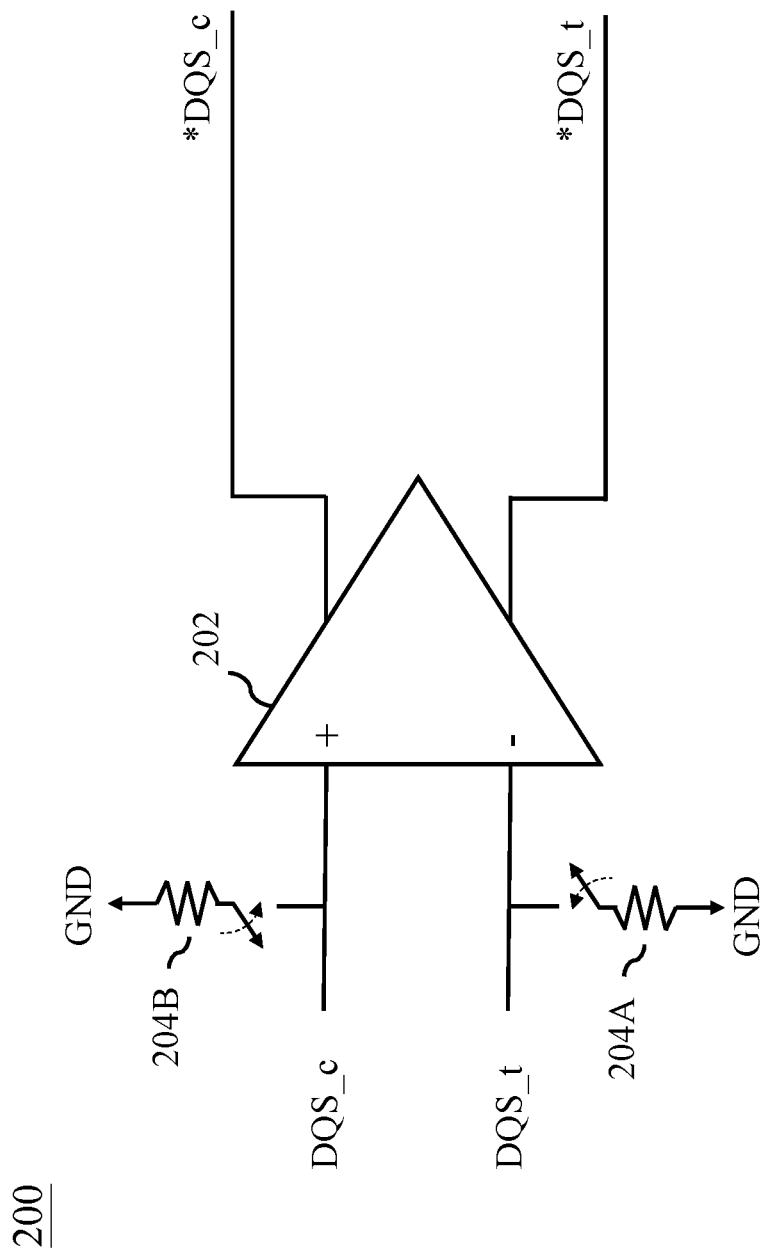
FIG. 2 is a schematic diagram of a receiver circuit 200 in accordance with an embodiment of the present disclosure.

FIG. 2 is a schematic diagram of a receiver circuit 200 in accordance with an embodiment of the present disclosure. FIGS. 3A-3E are waveform diagrams of the data strobe signals during a write operation in accordance with an embodiment of the present disclosure. Please refer to FIG. 1, FIG. 2, and FIGS. 3A-3E.

In some embodiments, the receiver circuit 1211 shown in FIG. 1 can be implemented using the receiver circuit 200 shown in FIG. 2. The receiver circuit 200 may include a differential amplifier 202 configured to amplify the data strobe signals DQS_c and DQS_t to generate the data strobe signal *DQS_c and *DQS_t. In addition, the negative input terminal and the positive input terminal of the differential amplifier 202 may be coupled to on-die terminators (ODT) 204A and 204B, respectively. The ODTs 204A and 204B may be configured to suppress the noises on the received data strobe signals DQS_c and DQS_t.

For example, the receiver circuit 200 may receive the data strobe signals DQS_c and DQS_t at its positive input terminal (e.g., +) and negative input terminal (e.g., −), respectively, to generate the data strobe signal *DQS_c and *DQS_t. In some embodiments, the amplitude of the data strobe signals DQS_c and DQS_t may be between 50 mv and 100 mv, which may not have a sufficient voltage level (e.g., 0.6V or 1.1V for an LPDDR4 DRAM) for the control circuit 122 to perform a write operation or a read operation. The amplitude of the data strobe signal *DQS_c and *DQS_t may be approximately 0.6V or 1.1V, and the control circuit 122 can perform a write operation or a read operation according to the command control signals 11 and the data strobe signal *DQS_c and *DQS_t.

In some embodiments, given that the memory device 120 is an LPDDR4 DRAM and the memory controller 110 follows the LPDDR4 standard (e.g., the write data strobe (WDQS) function is turned on), when the memory controller 110 issues a write command to the memory device 120, the data strobe signals DQS_t and DQS_c should be respectively kept at the low logic state and the high logic state prior to a write preamble being issued to the memory device 120 by the memory controller 110 at time t0. The duration tWPRE of the write preamble may last two clock cycles (e.g., from time t0 to time t4) till the data (e.g., data signals 12) being received by the control circuit 122 at time t4, and the data strobe signals DQS_t and DQS_c may vary in the duration tWPRE of the write preamble, as shown in FIG. 3A.

However, in some cases, the WDQS function of the memory controller 110 may not be turned on or properly implemented, resulting in uncertain logic states of the data strobe signals DQS_t and DQS_c for a duration (e.g., the time interval from time t(n−4) to time t0) prior to the write preamble being received by the control circuit 122 at time t0.

Figure 3A:
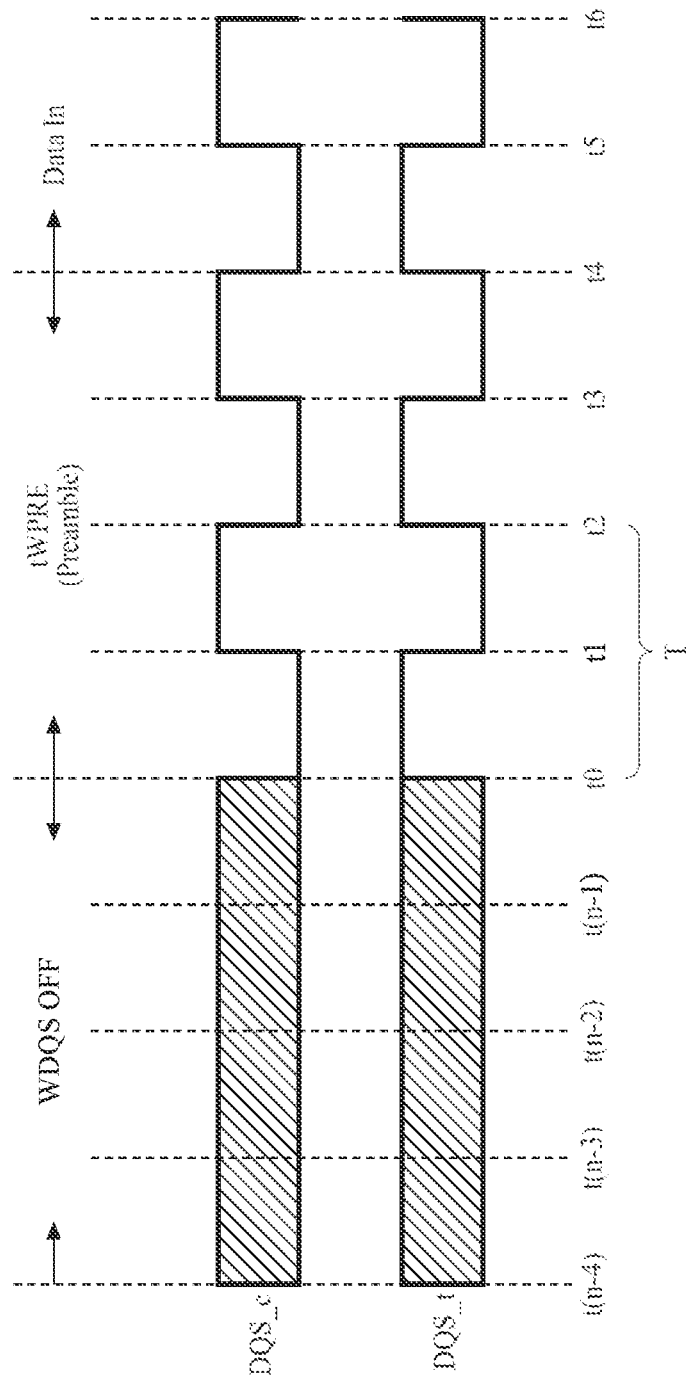

For example, as depicted in FIG. 3A, the time interval between every two adjacent time points from t(n−4) to t6 may be half a clock cycle T/2. In other words, two time intervals (e.g., from t0 to t2) may constitute a clock cycle T.

Figure 3B:
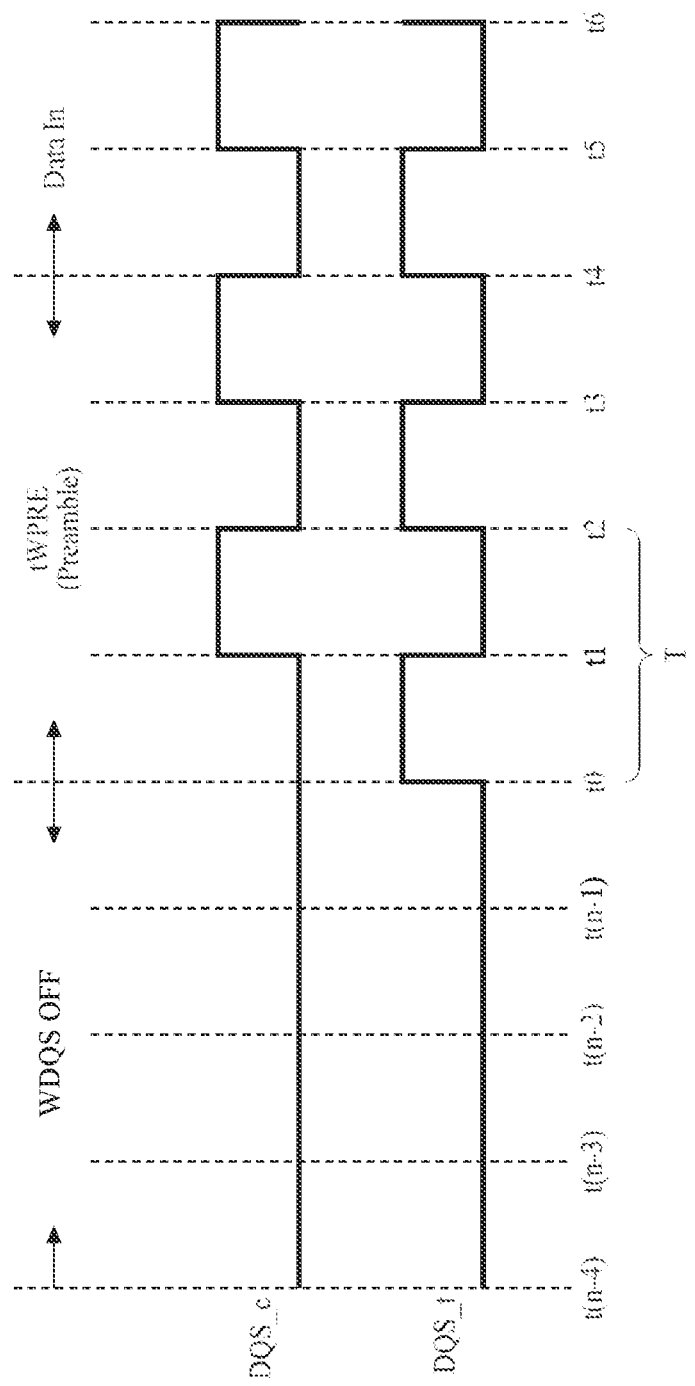

At time t0, the write preamble tWPRE is issued by the memory controller 110. If the WDQS function is turned off, the logic states of the data strobe signals DQS_t and DQS_c may be uncertain for a duration (e.g., from time t(n−4) to time t0) prior to the write preamble tWPRE being issued at time t0, as shown in FIG. 3A. This situation can cause failure of the control circuit 122 during a write operation. More specifically, there are four conditions of the logic states of the data strobe signals DQS_t and DQS_c for a duration prior to time t0. In the first condition, the WDQS function of the memory controller 110 may be not enabled, and the data strobe signals DQS_t and DQS_c may be kept at the low logic state for a duration prior to the write preamble being received by the control circuit 122 at time to, as shown in FIG. 3B. The first condition can cause failure of the control circuit 122 during a write operation since the first condition does not comply with the requirement of a write operation of the LPDDR4 standard defined by the JEDEC.

In the second condition, the WDQS function of the memory controller 110 may be not enabled, and the data strobe signals DQS_t and DQS_c may be kept at the high logic state for a duration prior to the write preamble being received by the control circuit 122 at time to, as shown in FIG. 3C. The second condition can cause failure of the control circuit 122 during a write operation since the second condition does not comply with the requirement of a write operation of the LPDDR4 standard defined by the JEDEC.

In the third condition, the WDQS function of the memory controller 110 may be enabled, and the data strobe signals DQS_t and DQS_c respectively kept at the low logic state and the high logic state for a duration prior to the write preamble being received by the control circuit 122 at time t0, as shown in FIG. 3D. The third condition will not cause failure of the control circuit 122 during a write operation since the third condition complies with the requirement of a write operation of the LPDDR4 standard defined by the JEDEC.

Figure 3E:
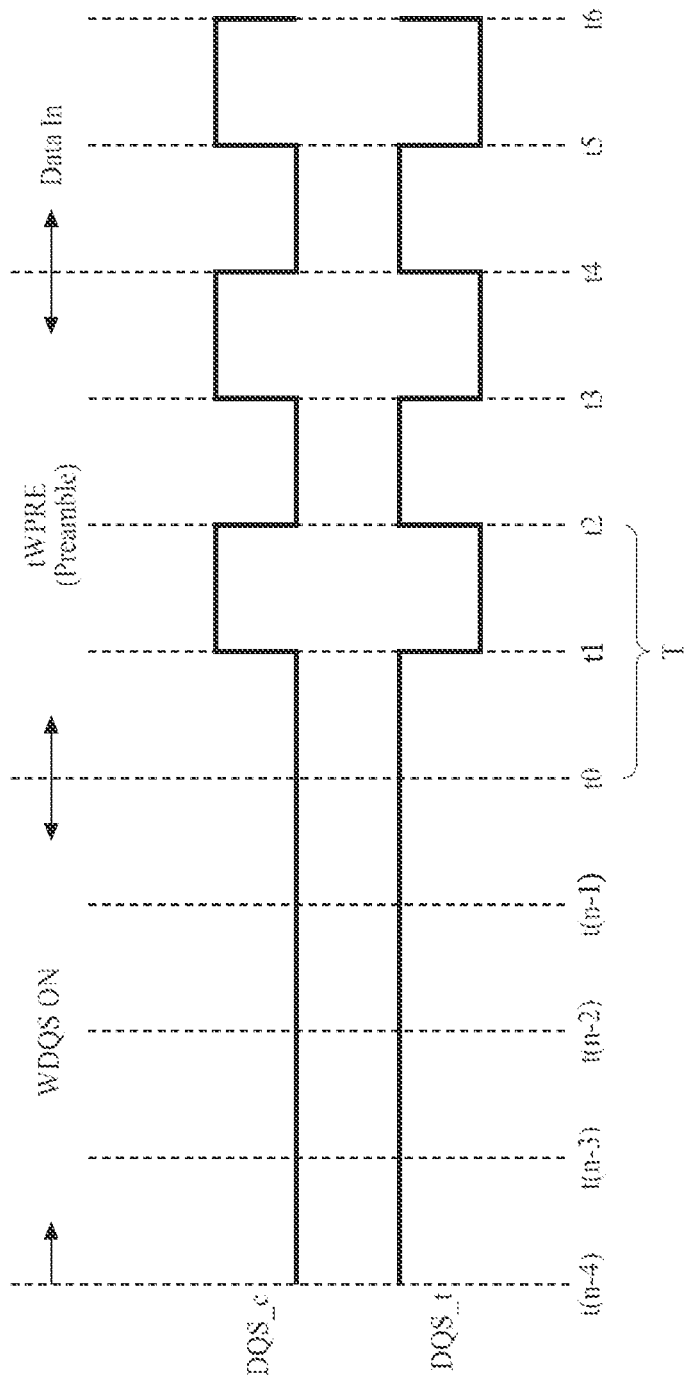

In the fourth condition, the WDQS function of the memory controller 110 may be enabled, and the data strobe signals DQS_t and DQS_c respectively kept at the high logic state and the low logic state for a duration prior to the write preamble being received by the control circuit 122 at time t0, as shown in FIG. 3E. The fourth condition will also not cause failure of the control circuit 122 during a write operation since the fourth condition complies with the LPDDR4 standard defined by the JEDEC.

Reference is now made to FIG. 2 again. In some embodiments, the resistances of the ODTs 204A and 204B may vary between a plurality of preset resistances, which may include 40 ohms, 60 ohms, 80 ohms, 120 ohms, 240 ohms, and an open-circuit resistance, and they are determined by the setting value of the corresponding mode register(s) in the memory device 120 set by the memory controller 110. In addition, when the WDQS function is turned off, the memory controller 110 may likely set the mode register corresponding to the ODTs 204A and 204B to a specific value (e.g., 0) so that the ODTs 204A and 204B are turned off to act as open circuits. In this situation, the amplitude of the noises received by the receiver circuit 1211 will not be suppressed. The differential amplifier 202 depicted in FIG. 2 amplifies the data strobe signals DQS_t and DQS_c as well as the noises on the data strobe signals DQS_t and DQS_c. In some embodiments, the amplitude of the data strobe signals DQS_t and DQS_c may be approximately between 300 mV and 600 mV, and the amplitude of the noises on the data strobe signals DQS_t and DQS_c may be approximately between 80 mV to 170 mV.

When the data strobe signals DQS_t and DQS_c are in the low logic state and the WDQS function is turned off, the amplified noises may reach amplitudes similar to those of the data strobe signals DQS_t and DQS_c in the high logic state. Accordingly, the amplified noises will be more probable to cause the data strobe signals DQS_t and DQS_c to change from the low logic state to the high logic state, potentially leading to misoperation or failure of the control circuit 122.

Figure 3F:
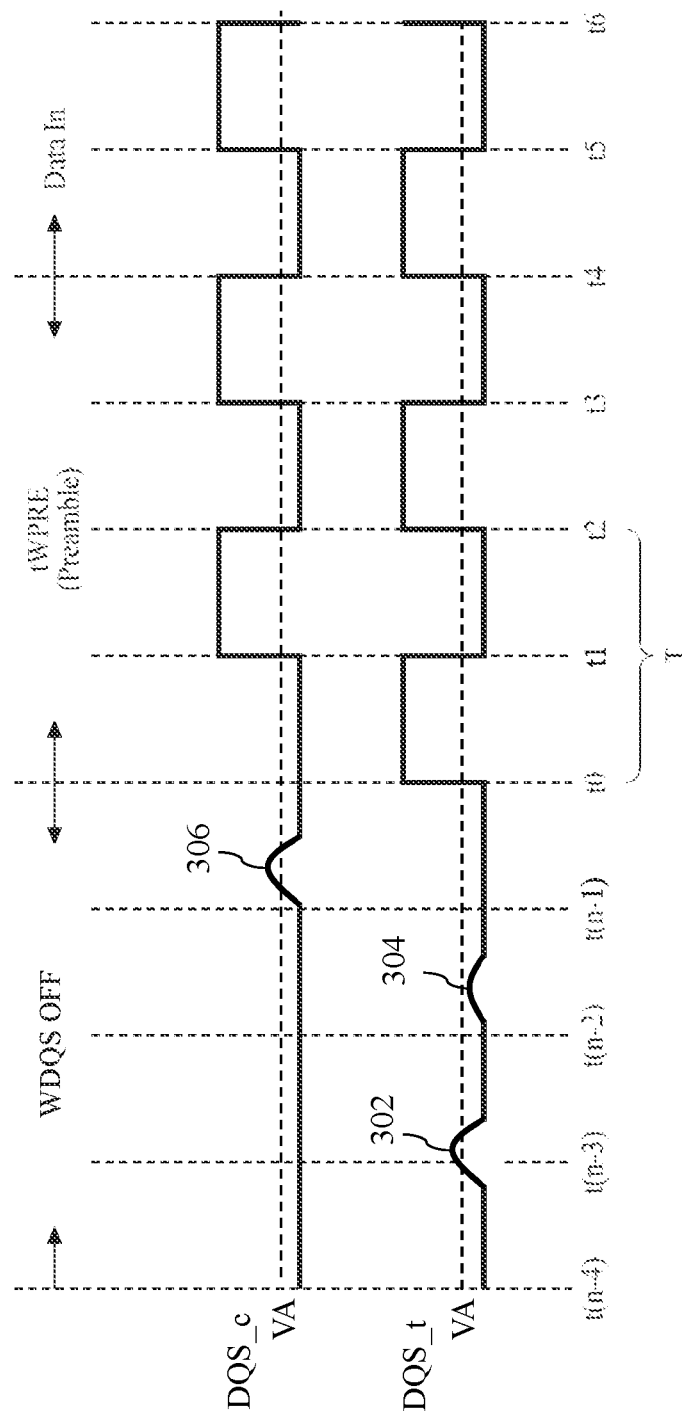

Referring to FIG. 3F, noises 302 and 304 are on the data strobe signal DQS_t, and a noise 306 is on the data strobe signal DQS_c. The noises 302 and 306 may have amplitudes higher than a particular voltage VA (e.g., approximately 90 mV), and the noise 304 may have an amplitude lower than the particular voltage VA. More specifically, when the amplitude of a noise on the data strobe signal DQS_t or DQS_c is higher than the particular voltage VA (e.g., noises 302 and 306), the amplified noise will cause the data strobe signals DQS_t and DQS_c to change from the low logic state to the high logic state, potentially leading to malfunctions or failures of the control circuit 122. The receiver circuit 400 shown in FIG. 4 provides a solution to this issue, the details of which will be discussed further.

Figure 4:
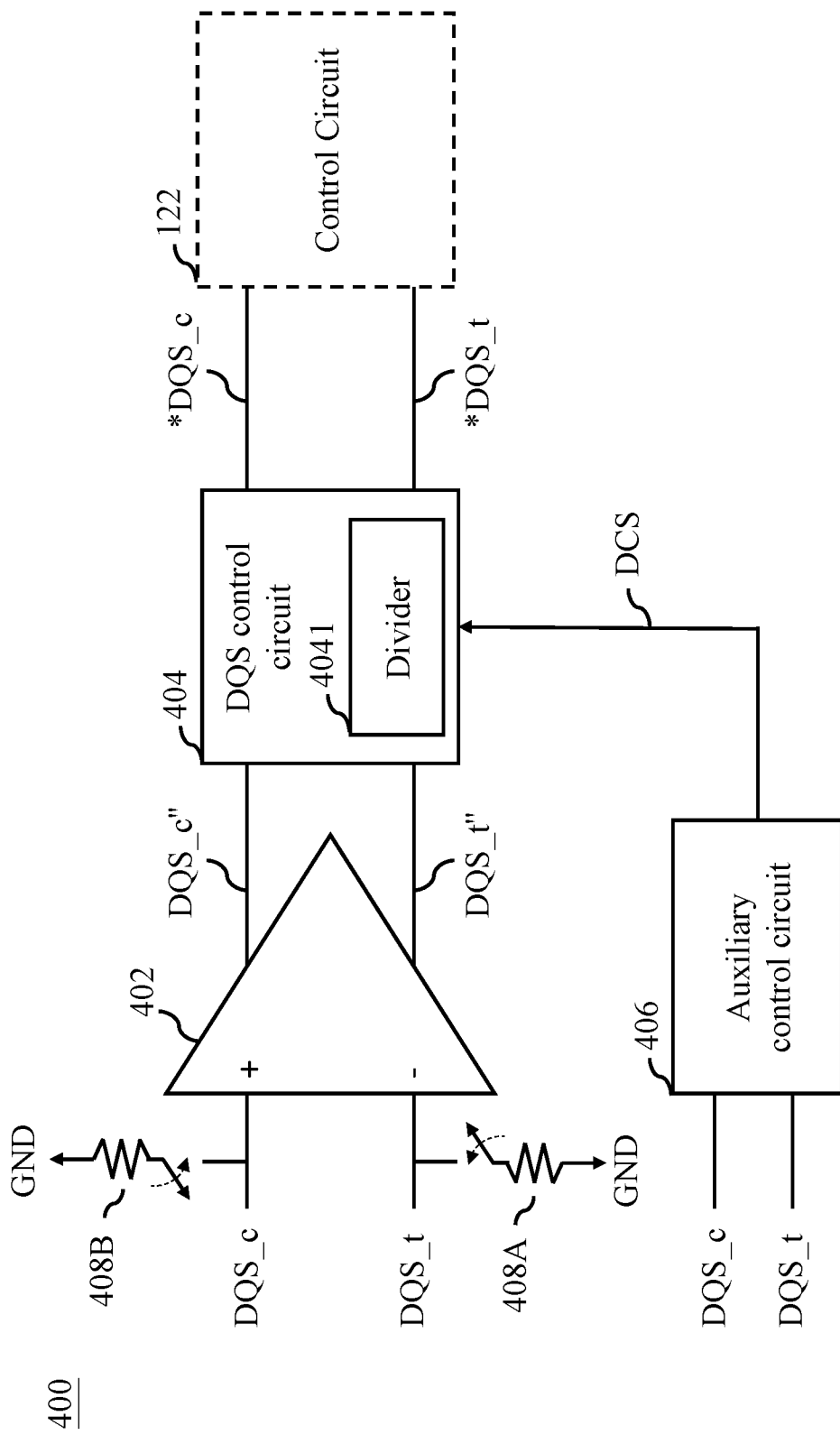
FIG. 4 is a diagram of a receiver circuit in accordance with another embodiment of the present disclosure.

FIG. 4 is a schematic diagram of a receiver circuit 400 in accordance with another embodiment of the present disclosure.

In some embodiments, the receiver circuit 1211 shown in FIG. 1 can be implemented using the receiver circuit 400 shown in FIG. 4. The receiver circuit 400 may include a differential amplifier 402, a data strobe (DQS) control circuit 404, and auxiliary control circuit 406. In some other embodiments, the receiver circuit 400 may further include ODTs 408A and 408B coupled to the negative input terminal (−) and the positive input terminal (+) of the differential amplifier 402. The ODTs 408A and 408B may be similar to the ODTs 204A and 204B shown in FIG. 2, the details of which will not be repeated here.

In some embodiments, the differential amplifier 402 may be configured to amplify the data strobe signals DQS_c and DQS_t (e.g., input data strobe signals) to generate the data strobe signals DQS_c" and DQS_t".

In some embodiments, the DQS control circuit 404 may include a divider 4041 that is configured to divide a clock signal by a preset multiple to generate a divided clock signal, so the DQS control circuit 404 can control the delay time and phase of the data strobe signals DQS_c" and DQS_t" to generate data strobe signals *DQS_c and *DQS_t. In addition, the data strobe signals *DQS_c and *DQS_t can be referred to as the data strobe signals 13 and 14 in FIG. 1, respectively.

In some embodiments, the auxiliary control circuit 406 may be configured to generate a disable control signal DCS according to the data strobe signals DQS_c and DQS_t received by the receiver circuit 400. Specifically, when both the data strobe signals DQS_c and DQS_t are in the low logic state (e.g., "0"), the disable control signal DCS generated by the auxiliary control circuit 406 is in the high logic state (e.g., "1"). Otherwise, where the logic states of the data strobe signals DQS_c and DQS_t are in any combination of (0, 1), (1, 0), and (1, 1), the disable control signal DCS generated by the auxiliary control circuit 406 is in the low logic state. The relationships between the logic states of the data strobe signals DQS_c and DQS_t and the data strobe signal DCS are shown in Table 1 below.

TABLE 1

| DQS_c | DQS_t | DCS |
|---|---|---|
| 0 | 0 | 1 |
| 0 | 1 | 0 |
| 1 | 0 | 0 |
| 1 | 1 | 0 |

In some embodiments, in response to the disable control signal DCS being in the high logic state, the DQS control circuit 404 turns off the divider 4041. This prevents the logic states of the data strobe signals *DQS_t and *DQS_c from being affected by variations in logic states of the data strobe signals DQS_t" and DQS_c" caused by noises, ensuring that they remain in the low logic state. This helps to prevent malfunctions or failures of the control circuit 122 (e.g., including a command decoder) that receives the data strobe signals *DQS_t and *DQS_c. In response to the disable control signal DCS being in the low logic state, the DQS control circuit 404 enables the divider 4041, and outputs the data strobe signals DQS_c" and DQS_t" as the data strobe signals *DQS_c and *DQS_t. This allows the control circuit 122, which receives the data strobe signals *DQS_t and *DQS_c, to operate normally, such as performing a memory operation on the memory device 120.

Figure 5A:
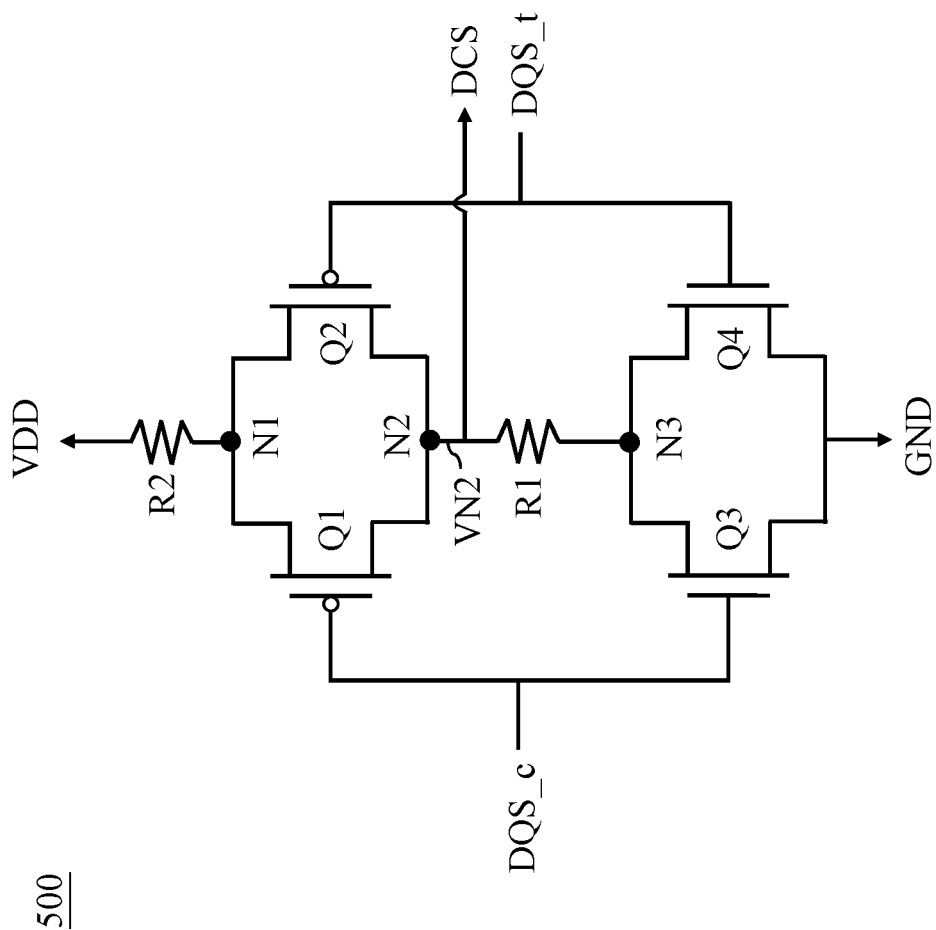
FIG. 5A is a schematic diagram of the auxiliary control circuit in accordance with the embodiment of FIG. 4.

FIG. 5A is a schematic diagram of the auxiliary control circuit in accordance with the embodiment of FIG. 4. FIGS. 5B-5F are equivalent schematic diagrams of the auxiliary control circuit of FIG. 5A in different conditions.

In some embodiments, the auxiliary control circuit 406 shown in FIG. 4 can be implemented using the auxiliary control circuit 500 shown in FIG. 5. The auxiliary control circuit 500 may include transistors Q1 to Q4, and resistors R1 and R2. Transistors Q1-Q2 are P-type transistors, and transistors Q3-Q4 are N-type transistors. The transistors Q1 may have a gate electrically connected to the data strobe signal DQS_c, a drain electrically connected to node N2, and a source electrically connected to node N1. The transistors Q2 may have a gate electrically connected to the data strobe signal DQS_t, a drain electrically connected to node N2, and a source electrically connected to node N1.

The transistors Q3 may have a gate electrically connected to the data strobe signal DQS_c, a drain electrically connected to node N3, and a source electrically connected to the ground (i.e., GND). The transistors Q4 may have a gate electrically connected to the data strobe signal DQS_t, a drain electrically connected to node N3, and a source electrically connected to the ground (i.e., GND). In addition, a resistor R1 is coupled between nodes N2 and N3, and a resistor R2 is coupled between the power supply voltage VDD and node N1. Node N2 may serve as an output terminal of the auxiliary control circuit 500 that outputs the disable control signal DCS.

In some embodiments, given that R refers to a reference resistance value, it is assumed that the source-drain resistance ($R_{DS}$) of transistors Q1-Q4 in the ON state is 0.1 R, and that of transistors Q1-Q4 in the OFF state is approximately 1000 R or higher. For brevity, it is assumed that the source-drain resistance of transistors Q1-Q4 in the OFF state is 1000 R. In some embodiments, the reference resistance value R may range between tens of kilohms (KΩ) and thousands of kilohms (KΩ), but the present disclosure is not limited thereto. In addition, the resistance of the resistor R1 may be approximately equal to R, and that of the resistor R2 may be approximately between 2 R and 10 R. For simplicity, the resistance of the resistor R2 is 10 R in the following embodiments.

In some embodiments, when the memory device is an LPDDR4 memory, the power supply voltage VDD may be approximately equal to 1.1V, and the reference voltage VrefDQS for the data strobe signals DQS_t and DQS_c is 0.5VDD=0.55V.

Specifically, the logic states of the data strobe signals DQS_t and DQS_c are determined by the amplitude thereof. For example, when the amplitude of the data strobe signal DQS_t or DQS_c is equal to or higher than the reference voltage VrefDQS, the data strobe signal DQS_t or DQS_c can be regarded as logic "1". When the amplitude of the data strobe signal DQS_t or DQS_c is lower than the reference voltage VrefDQS, the data strobe signal DQS_t or DQS_c can be regarded as logic "0". The detailed operations of the auxiliary control circuit 500 described in the following sections can be accompanied by the four conditions of the data strobe signals DQS_t and DQS_c shown in FIGS. 3B to 3E.

Figure 5B:
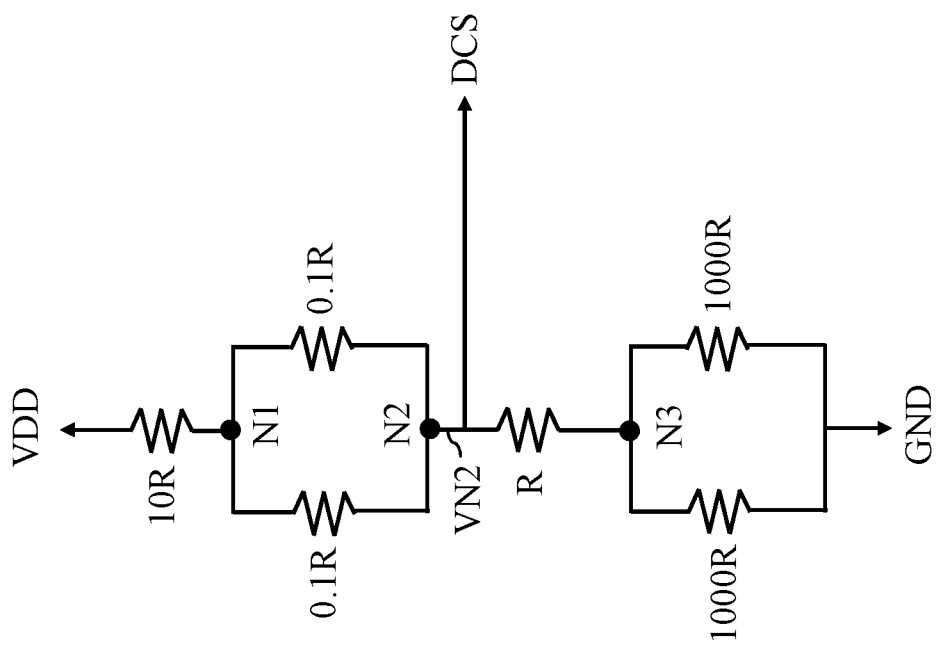
FIGS. 5B-5F are equivalent schematic diagrams of the auxiliary control circuit of FIG. 5A in different conditions.

In the first condition, the WDQS function of the memory controller 110 may be not enabled, and the data strobe signals DQS_t and DQS_c are kept at the low logic state (i.e., DQS_t=0 and DQS_c=0) for a duration prior to the write preamble being received by the control circuit 122 at time t0, as shown in FIG. 3B. At this time, transistors Q1 and Q2 are fully turned on, and transistors Q3 and Q4 are fully turned off. Accordingly, the equivalent resistances of the transistors Q1 and Q2 can be set to 0.1 R, and those of transistors Q3 and Q4 can be set to 1000 R, as shown in FIG. 5B. In other words, since the resistances of the transistors Q1 and Q2 are shunt, the equivalent resistance of both transistors Q1 and Q2 is 0.05 R. Similarly, since the resistances of the transistors Q3 and Q4 are shunt, the equivalent resistance of both transistors Q3 and Q4 is 500 R. The equivalent auxiliary control circuit 500B can be regarded as a voltage divider, and the voltage VN2 of the disable control signal DCS at the output terminal (i.e., node N2) of the auxiliary control circuit 500 can be calculated using formula (1):

$$VN2 = \frac{1R + 500R}{10R + 0.05R + 1R + 500R} VDD = 0.98\ VDD \quad (1)$$

Since 0.98VDD is approximately equal to 1.089V higher than the reference voltage VrefDQS (e.g., 0.55V), the disable control signal DCS at node N2 is in the high logic state (i.e., logic "1").

Figure 5C:
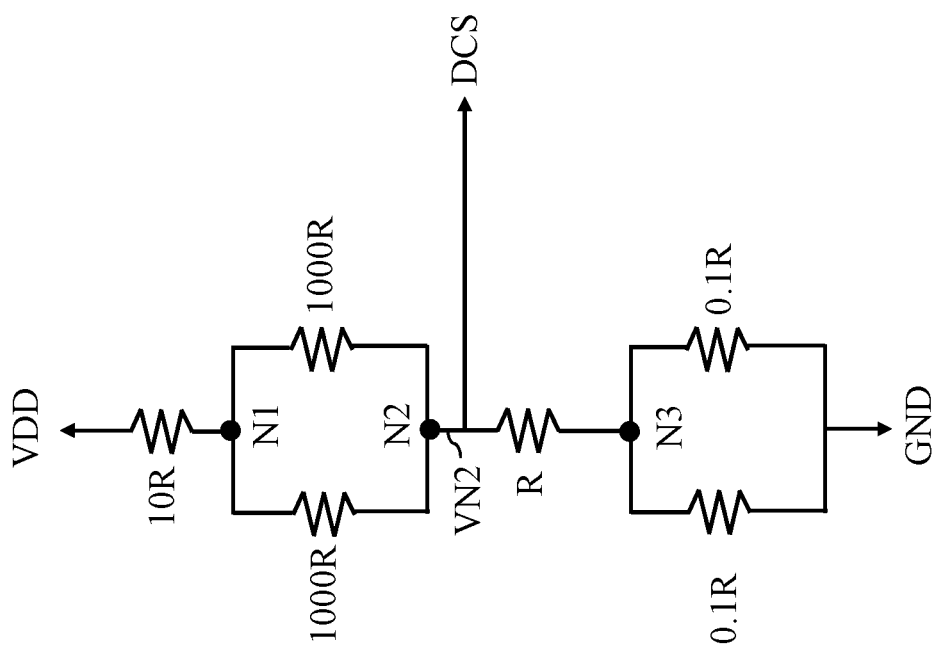

In the second condition, the WDQS function of the memory controller 110 may be not enabled, and the data strobe signals DQS_t and DQS_c are kept at the high logic state (i.e., DQS_t=1 and DQS_c=1) for a duration prior to the write preamble being received by the control circuit 122 at time to, as shown in FIG. 3C. At this time, transistors Q1 and Q2 are fully turned off, and transistors Q3 and Q4 are fully turned on. Accordingly, the equivalent resistances of transistors Q1 and Q2 can be set to 1000 R, and those of transistors Q3 and Q4 can be set to 0.1 R, as shown in FIG. 5C. In other words, since the resistances of the transistors Q1 and Q2 are shunt, the equivalent resistance of both transistors Q1 and Q2 is 500 R. Similarly, since the resistances of the transistors Q3 and Q4 are shunt, the equivalent resistance of both transistors Q3 and Q4 is 0.05 R. The equivalent auxiliary control circuit 500C can be regarded as a voltage divider, and the voltage VN2 of the disable control signal DCS at the output terminal (i.e., node N2) of the auxiliary control circuit 500 can be calculated using formula (2):

$$VN2 = \frac{1R + 0.05R}{10R + 500R + 1R + 0.05R} VDD = 0.002\ VDD \quad (2)$$

Since 0.002VDD is approximately equal to 0V which is lower than the reference voltage VrefDQS (e.g., 0.55V), the disable control signal DCS at node N2 is in the low logic state (i.e., logic "0").

Figure 5D:
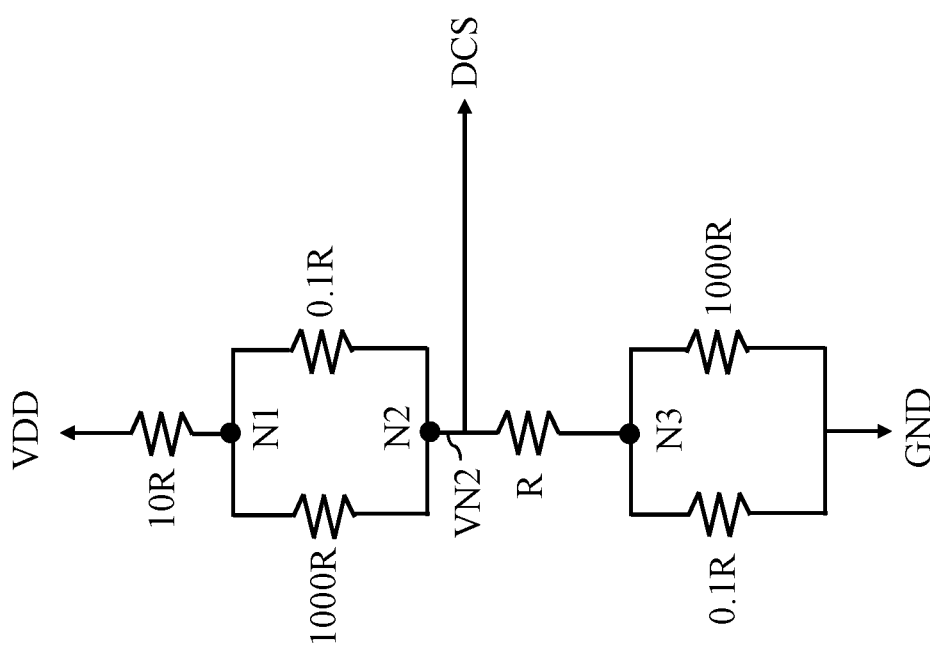

In the third condition, the WDQS function of the memory controller 110 may be enabled, and the data strobe signals DQS_t and DQS_c respectively kept at the low logic state and the high logic state (i.e., DQS_t=0 and DQS_c=1) for a duration prior to the write preamble being received by the control circuit 122 at time t0, as shown in FIG. 3D. At this time, transistors Q1 and Q4 are fully turned off, and transistors Q2 and Q3 are fully turned on. Accordingly, the equivalent resistances of the transistors Q1 and Q4 can be set to 1000 R, and those of transistors Q2 and Q3 can be set to 0.1 R, as shown in FIG. 5D. In other words, since the resistances of the transistors Q1 and Q2 are shunt, the equivalent resistance of both transistors Q1 and Q2 is approximately 0.1 R. Similarly, since the resistances of the transistors Q3 and Q4 are shunt, the equivalent resistance of both transistors Q3 and Q4 is approximately 0.1 R. The equivalent auxiliary control circuit 500D can be regarded as a voltage divider, and the voltage VN2 of the disable control signal DCS at the output terminal (i.e., node N2) of the auxiliary control circuit 500 can be calculated using formula (3):

$$VN2 = \frac{1R + 0.1R}{10R + 0.1R + 1R + 0.1R} VDD = 0.098\ VDD \quad (3)$$

Since 0.098VDD is approximately equal to 0.1V which is lower than the reference voltage VrefDQS (e.g., 0.55V), the disable control signal DCS at node N2 is in the low logic state (i.e., logic "0").

Figure 5E:
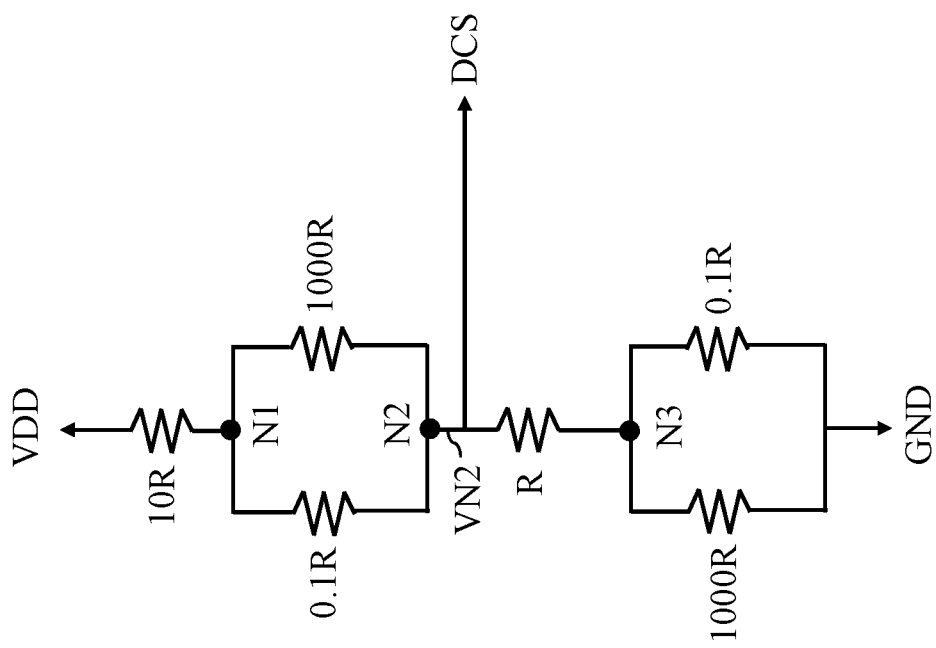
Figure 5F:
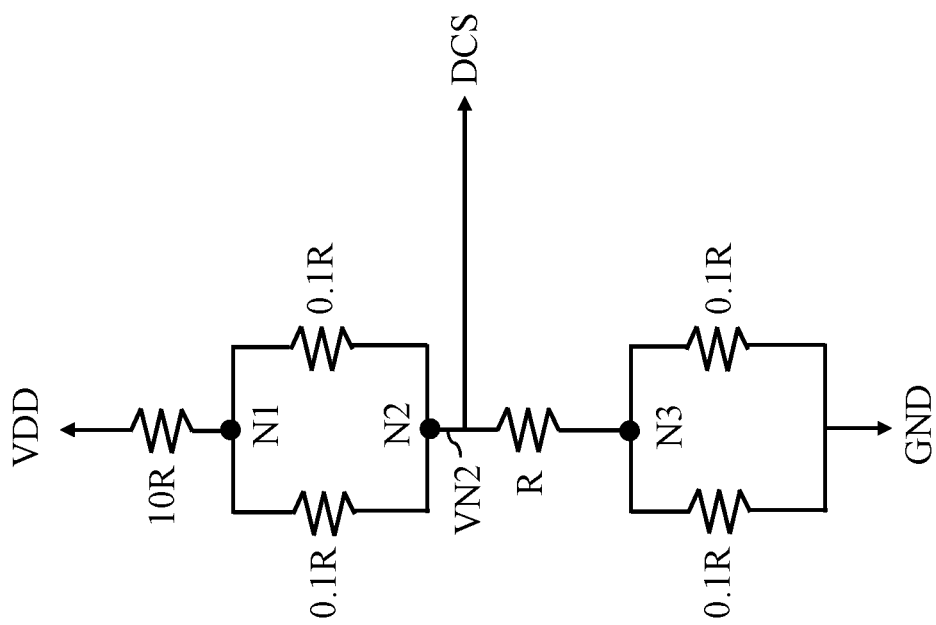

In the fourth condition, the WDQS function of the memory controller 110 may be enabled, and the data strobe signals DQS_t and DQS_c respectively kept at the high logic state and the low logic state (i.e., DQS_t=1 and DQS_c=0) for a duration prior to the write preamble being received by the control circuit 122 at time to, as shown in FIG. 3D. At this time, transistors Q2 and Q3 are fully turned off, and transistors Q1 and Q4 are fully turned on. Accordingly, the equivalent resistances of the transistors Q2 and Q3 can be set to 1000 R, and those of transistors Q1 and Q4 can be set to 0.1 R, as shown in FIG. 5E. In other words, since the resistances of the transistors Q1 and Q2 are shunt, the equivalent resistance of both transistors Q1 and Q2 is approximately 0.1 R. Similarly, since the resistances of the transistors Q3 and Q4 are shunt, the equivalent resistance of both transistors Q3 and Q4 is approximately 0.1 R. The equivalent auxiliary control circuit 500E can be regarded as a voltage divider, and the voltage VN2 of the disable control signal DCS at the output terminal (i.e., node N2) of the auxiliary control circuit 500 can be calculated using formula (4):

$$VN2 = \frac{1R + 0.1R}{10R + 0.1R + 1R + 0.1R} VDD = 0.098\ VDD \quad (4)$$

Since 0.098VDD is approximately equal to 0.1V which is lower than the reference voltage VrefDQS (e.g., 0.55V), the disable control signal DCS at node N2 is in the low logic state (i.e., logic "0").

In a fifth condition, where the data strobe signal DQS_t and DQS_c are normally toggled every half clock cycle, the voltage level of the data strobe signals DQS_t and DQS_c can be equal to 0.5VDD at the cross point. The cross point may be refer to a cross point of the rising edge of the data strobe signal DQS_t and the falling edge of the data strobe signal DQS_c, or refer to a cross point of the rising edge of the data strobe signal DQS_c and the falling edge of the data strobe signal DQS_t. Accordingly, the transistors Q1 to Q4 are in the ON state, and the equivalent resistances of transistors Q1 to Q4 can be set to 0.1 R, as shown in FIG. 5E. In other words, since the resistances of the transistors Q1 and Q2 are shunt, the shunt resistance of both transistors Q1 and Q2 is approximately 0.05 R. Similarly, since the resistances of the transistors Q3 and Q4 are shunt, the shunt resistance of shunted transistors Q3 and Q4 is approximately 0.05 R. The equivalent auxiliary control circuit 500F can be regarded as a voltage divider, and the voltage VN2 of the disable control signal DCS at the output terminal (i.e., node N2) of the auxiliary control circuit 500 can be calculated using formula (5):

$$VN2 = \frac{1R + 0.05R}{10R + 0.05R + 1R + 0.05R} VDD = 0.095 \ VDD \quad (5)$$

Since 0.095VDD is approximately equal to 0.1V which is lower than the reference voltage VrefDQS (e.g., 0.55V), the disable control signal DCS at node N2 is in the low logic state (i.e., logic "0").

In view of the aforementioned embodiments in FIGS. 5A-5F, the disable control signal DCS generated by the auxiliary control circuit 500 is in the high logic state when the data strobe signals DQS_t and DQS_c are in the low logic state (i.e., the first condition). Thus, the DQS control circuit 404 shown in FIG. 4 can be disabled in response to the disable control signal DCS being in the high logic state, so it will not lead to malfunctions or failures of the command decoder (not shown) in the control circuit 122. When the data strobe signals DQS_t and DQS_c are in any of the second to fifth conditions, the disable control signal DCS generated by the auxiliary control circuit 500 is in the low logic state, so the command decoder in the control circuit 122 can work normally.

Figure 6:
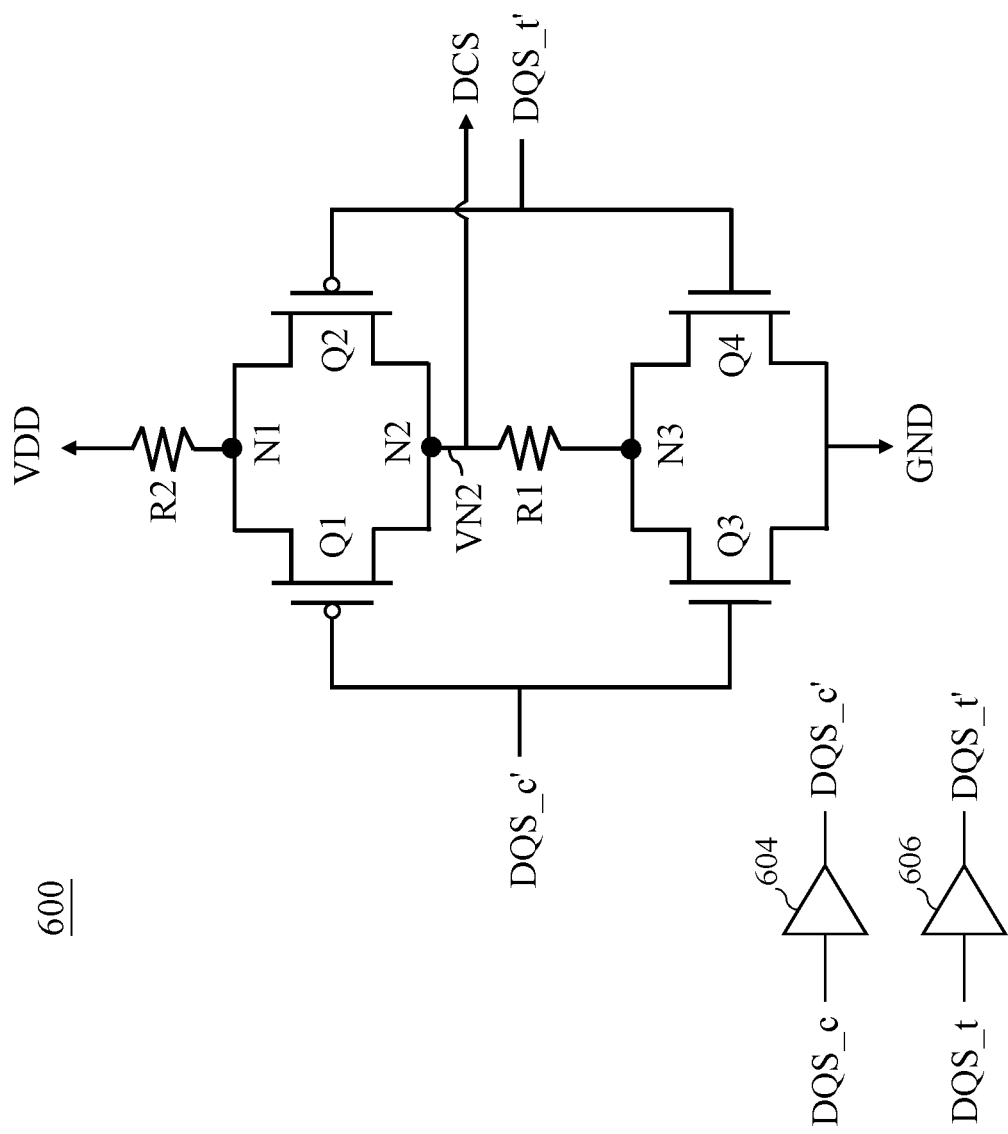
FIG. 6 is another schematic diagram of the auxiliary control circuit in accordance with the embodiment of FIG. 4.

FIG. 6 is another schematic diagram of the auxiliary control circuit in accordance with the embodiment of FIG. 4.

In some embodiments, the auxiliary control circuit 406 shown in FIG. 4 can be implemented using the auxiliary control circuit 600 shown in FIG. 6. The auxiliary control circuit 600 may include transistors Q1 to Q4, resistors R1 and R2, and amplifiers 604 and 606. Transistors Q1-Q2 are P-type transistors, and transistors Q3-Q4 are N-type transistors. The transistors Q1 may have a gate electrically connected to the data strobe signal DQS_c, a drain electrically connected to node N2, and a source electrically connected to node N1. The transistors Q2 may have a gate electrically connected to the data strobe signal DQS_t, a drain electrically connected to node N2, and a source electrically connected to node N1.

The transistors Q3 may have a gate electrically connected to the data strobe signal DQS_c, a drain electrically connected to node N3, and a source electrically connected to the ground (i.e., GND). The transistors Q4 may have a gate electrically connected to the data strobe signal DQS_t, a drain electrically connected to node N3, and a source electrically connected to the ground (i.e., GND). In addition, a resistor R1 is coupled between nodes N2 and N3, and a resistor R2 is coupled between the power supply voltage VDD and node N1. Node N2 may serve as an output terminal of the auxiliary control circuit 500 that outputs the disable control signal DCS.

In some embodiments, the memory device 120 may be operated using a power supply voltage of 0.6V or 1.1V. However, the amplitude of the data strobe signals DQS_c and DQS_t from the memory controller 110 is between 50 mv and 100 mv, the voltage level of which is insufficient for the control circuit 122 to perform a write or read operation on the memory device 120. In addition, the amplitude of the data strobe signals DQS_c and DQS_t is insufficient to turn on the transistors Q1 to Q4 since the threshold voltage of the transistors Q1 to Q4 may be between 0.5V and 0.7V. The amplitude of the amplified data strobe signals DQS_c' and DQS_t' generated by the amplifiers 604 and 606 may be between 0.6V and 1.1V, the voltage level of which is sufficient for the control circuit 122 to perform a write or read operation on the memory device 120, and sufficient to turn on the transistors Q1 to Q4.

More specifically, the auxiliary control circuit 600 shown in FIG. 6 may be similar to the auxiliary control circuit 500 shown in FIG. 5A, with the difference therebetween that the transistors Q1 and Q3 are controlled by the data strobe signal DQS_c', and the transistors Q2 and Q4 are controlled by the data strobe signal DQS_t'. Since the data strobe signals DQS_c' and DQS_t' have sufficient amplitude to turn on the transistors Q1 to Q4, the operations of the auxiliary control circuit 600 shown in FIG. 6 may be similar to those of the auxiliary control circuit 500 shown in FIG. 5A, the details of which can be found in the embodiments of FIGS. 5B-5F.

Figure 7:
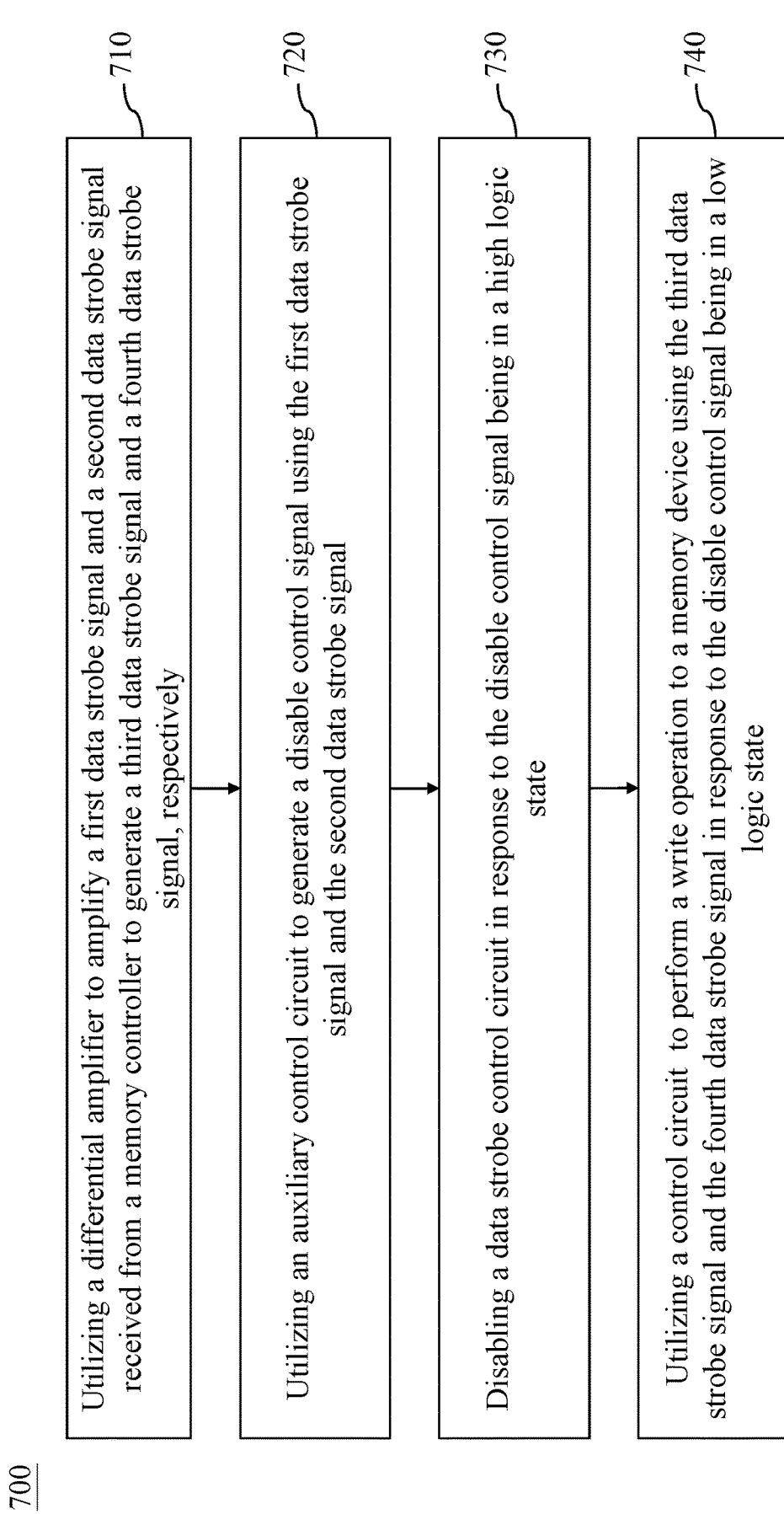
FIG. 7 is a flowchart of a method for controlling data strobe signals for use in a memory device in accordance with an embodiment of the present disclosure.

FIG. 7 is a flowchart of a method for controlling data strobe signals for use in a memory device in accordance with an embodiment of the present disclosure. Please refer to FIG. 1, FIG. 4, FIG. 5, and FIG. 7.

Step 710: utilizing a differential amplifier (e.g., differential amplifier 402) to amplify a first data strobe signal (e.g., DQS_c) and a second data strobe signal (e.g., DQS_t) received from a memory controller (e.g., memory controller 110) to generate a third data strobe signal (e.g., DQS_c") and a fourth data strobe signal (e.g., *DQS_t"), respectively. For example, the differential amplifier 402 of the receiver circuit 400 shown in FIG. 4 (or the differential amplifier 602 of the receiver circuit 600 shown in FIG. 6) is configured to amplify the first data strobe signal and the second data strobe signal to generate the third data strobe signal and the fourth data strobe signal. In other words, the amplitude of the third data strobe signal and the fourth data strobe signal is higher than that of the first data strobe signal and the second data strobe signal.

Step 720: utilizing an auxiliary control circuit (e.g., auxiliary control circuit 406) to generate a disable control signal DCS using the first data strobe signal (e.g., DQS_c) and the second data strobe signal (e.g., DQS_t). For example, when the first data strobe signal and the second data strobe signal are in the first condition (e.g., DQS_t=0 and DQS_c=0), the disable control signal DCS generated by the auxiliary control circuit 500 (or auxiliary control circuit 600) is in the high logic state. When the first data strobe signal and the second data strobe signal are in any of the second to fifth conditions, the disable control signal DCS generated by the auxiliary control circuit 500 (or auxiliary control circuit 600) is in the low logic state.

Step 730: disabling a data strobe control circuit (e.g., data strobe control circuit 404) in response to the disable control signal DCS being in a high logic state (e.g., "1"). For example, in response to the disable control signal DCS being in the high logic state, the DQS control circuit 404 turns off the divider 4041. This prevents the logic states of the data strobe signals *DQS_t and *DQS_c from being affected by variations in logic states of the data strobe signals DQS_t" and DQS_c" caused by noises, ensuring that they remain in the low logic state. This helps to prevent malfunctions or failures of the control circuit 122 (e.g., including a command decoder) that receives the data strobe signals *DQS_t and *DQS_c.

Step 740: utilizing a control circuit (e.g., control circuit 122) to perform a write operation to a memory device (e.g., memory device 120) 120 using the third data strobe signal (e.g., DQS_c") and the fourth data strobe signal (e.g., DQS_t") in response to the disable control signal DCS being in a low logic state (e.g., "0"). For example, in response to the disable control signal DCS being in the low logic state, the DQS control circuit 404 enables the divider 4041, and outputs the data strobe signals DQS_c" and DQS_t" as the data strobe signals *DQS_c and *DQS_t. This allows the control circuit 122, which receives the data strobe signals *DQS_t and *DQS_c, to operate normally, e.g., by performing a write operation on the memory device 120.

In an aspect of the present disclosure, a memory device is provided. The memory device includes a memory cell array, a control circuit, and an interface circuit. The control circuit is configured to control data access of the memory cell array. The receiver circuit is configured to receive a first data strobe signal and a second data strobe signal from a memory controller. The receiver circuit includes a differential amplifier, an auxiliary control circuit, and a data strobe control circuit. The differential amplifier is configured to amplify the first data strobe signal and the second data strobe signal to generate a third data strobe signal and a fourth data strobe signal. The auxiliary control circuit is configured to generate a disable control signal using the first data strobe signal and the second data strobe signal. The data strobe control circuit is configured to generate a first output data strobe signal and a second output data strobe signal according to the disable control signal, the third data strobe signal, and the fourth data strobe signal.

In some embodiments, in response to the first data strobe signal and the second data strobe signal satisfying a first condition, the disable control signal generated by the auxiliary control circuit is in a high logic state.

In some embodiments, the first condition indicates that the first data strobe signal and the second data strobe signal are in a low logic state.

In some embodiments, in response to the disable control signal being in the high logic state, the data strobe control circuit is disabled, and the first output data strobe signal and the second output data strobe signal generated by the data strobe control circuit are kept in the low logic state.

In some embodiments, in response to the first data strobe signal and the second data strobe signal not satisfying the first condition, the disable control signal generated by the auxiliary control circuit is in a low logic state.

In some embodiments, in response to the disable control signal being in the low logic state, the data strobe control circuit is activated to generate the first output data strobe signal and the second output data strobe signal using the third data strobe signal and the fourth data strobe signal.

In some embodiments, the auxiliary control circuit includes a first transistor, a second transistor, a third transistor, a fourth transistor, a first resistor, and a second resistor. The first transistor has a gate electrically connected to the first data strobe signal, a drain electrically connected to a first node, and a source electrically connected to a second node. The second transistor has a gate electrically connected to the second data strobe signal, a drain electrically connected to the first node, and a source electrically connected to the second node. The third transistor has a gate electrically connected to the first data strobe signal, a drain electrically connected to a third node, and a source being grounded. The fourth transistor has a gate electrically connected to the second data strobe signal, a drain electrically connected to the third node, and a source being grounded. The first resistor is coupled between the second node and the third node. The second resistor is coupled between a power supply voltage and the first node. The disable control signal is generated at the second node.

In some embodiments, a first resistance of the first resistor is lower than a second resistance of the second resistor.

In some embodiments, when the first transistor, the second transistor, the third transistor, and the fourth transistor have the first resistance and the second resistance in a turn-on state and a turn-off state, respectively, the second resistance is much higher than the first resistance.

In some embodiments, the first resistance and the second resistance refer to a first drain-source resistance and a second drain-source resistance of the first transistor, the second transistor, the third transistor, and the fourth transistor in the turn-on state and the turn-off state, respectively.

In some embodiments, in response to the first data strobe signal and the second data strobe signal being equal to half of the power supply voltage, the first transistor, the second transistor, the third transistor, and the fourth transistor have the first resistance in the turn-on state.

In some embodiments, the disable control signal is in the low logic state when the first transistor, the second transistor, the third transistor, and the fourth transistor are in the turn-on state.

In another aspect of the present disclosure, a memory device is provided. The memory device includes a memory cell array, a control circuit, and an interface circuit. The control circuit is configured to control data access of the memory cell array. The receiver circuit is configured to receive a first data strobe signal and a second data strobe signal from a memory controller. The receiver circuit includes a differential amplifier, an auxiliary control circuit, and a data strobe control circuit. The differential amplifier is configured to amplify the first data strobe signal and the second data strobe signal to generate a third data strobe signal and a fourth data strobe signal. The auxiliary control circuit is configured to generate a disable control signal using a fifth data strobe signal and a sixth data strobe signal generated from the first data strobe signal and the second data strobe signal, respectively. The data strobe control circuit is configured to generate a first output data strobe signal and a second output data strobe signal according to the disable control signal, the third data strobe signal, and the fourth data strobe signal.

In some embodiments, in response to the first data strobe signal and the second data strobe signal satisfying a first condition, the disable control signal generated by the auxiliary control circuit is in a high logic state.

In some embodiments, the first condition indicates that the first data strobe signal and the second data strobe signal are in a low logic state.

In some embodiments, in response to the disable control signal being in the high logic state, the data strobe control circuit is disabled, and the first output data strobe signal and the second output data strobe signal generated by the data strobe control circuit are kept in the low logic state.

In some embodiments, in response to the first data strobe signal and the second data strobe signal not satisfying the first condition, the disable control signal generated by the auxiliary control circuit is in a low logic state.

In some embodiments, in response to the disable control signal being in the low logic state, the data strobe control circuit is activated to generate the first output data strobe signal and the second output data strobe signal using the third data strobe signal and the fourth data strobe signal.

In some embodiments, the auxiliary control circuit includes a first amplifier, a second amplifier, a first transistor, a second transistor, a third transistor, a fourth transistor, a first resistor, and a second resistor. The first amplifier is configured to amplify the first data strobe signal to generate a first amplified data strobe signal. The second amplifier is configured to amplify the second data strobe signal to generate a second amplified data strobe signal. The first transistor has a gate electrically connected to the first amplified data strobe signal, a drain electrically connected to a first node, and a source electrically connected to a second node. The second transistor has a gate electrically connected to the second amplified data strobe signal, a drain electrically connected to the first node, and a source electrically connected to the second node. The third transistor has a gate electrically connected to the first data strobe signal, a drain electrically connected to a third node, and a source being grounded. The fourth transistor has a gate electrically connected to the second data strobe signal, a drain electrically connected to the third node, and a source being grounded. The first resistor is coupled between the second node and the third node. The second resistor is coupled between a power supply voltage and the first node. The disable control signal is generated at the second node.

In some embodiments, a first resistance of the first resistor is lower than a second resistance of the second resistor.

In some embodiments, an amplitude of the first amplified data strobe signal and the second amplified data strobe signal is higher than a threshold voltage of the first transistor, the second transistor, the third transistor, and the fourth transistor.

In some embodiments, when the first transistor, the second transistor, the third transistor, and the fourth transistor have the first resistance and the second resistance in a turn-on state and a turn-off state, respectively, the second resistance is much higher than the first resistance.

In some embodiments, the first resistance and the second resistance refer to a first drain-source resistance and a second drain-source resistance of the first transistor, the second transistor, the third transistor, and the fourth transistor in the turn-on state and the turn-off state, respectively.

In some embodiments, in response to the first data strobe signal and the second data strobe signal being equal to half of the power supply voltage, the first transistor, the second transistor, the third transistor, and the fourth transistor have the first resistance in the turn-on state.

In some embodiments, the disable control signal is in the low logic state when the first transistor, the second transistor, the third transistor, and the fourth transistor are in the turn-on state.

In yet another aspect of the present disclosure, a method for controlling data strobe signals for use in a memory device is provided. The memory device includes a receiver circuit having a differential amplifier, an auxiliary control circuit, and a data strobe control circuit. The method includes the following steps: utilizing the differential amplifier to amplify a first data strobe signal and a second data strobe signal received from a memory controller to generate a third data strobe signal and a fourth data strobe signal; utilizing the auxiliary control circuit to generate a disable control signal using the first data strobe signal and the second data strobe signal; and disabling the data strobe control circuit in response to the disable control signal being in a high logic state.

In some embodiments, the memory device further comprises a control circuit, and the method further comprises: utilizing the control circuit to perform a write operation to the memory device using the third data strobe signal and the fourth data strobe signal in response to the disable control signal being in a low logic state.

In some embodiments, in response to the first data strobe signal and the second data strobe signal satisfying a first condition, the disable control signal generated by the auxiliary control circuit is in the high logic state.

In some embodiments, the first condition indicates that the first data strobe signal and the second data strobe signal are in the low logic state.

In some embodiments, in response to the disable control signal being in the high logic state, the data strobe control circuit is disabled, and a first output data strobe signal and a second output data strobe signal generated by the data strobe control circuit are kept in the low logic state.

In some embodiments, in response to the first data strobe signal and the second data strobe signal not satisfying the first condition, the disable control signal generated by the auxiliary control circuit is in the low logic state.

In some embodiments, in response to the disable control signal being in the low logic state, the data strobe control circuit is activated to generate the first output data strobe signal and the second output data strobe signal using the third data strobe signal and the fourth data strobe signal.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, or steps.

What is claimed is:

1. A memory device, comprising:
a memory cell array;
a control circuit, configured to control data access of the memory cell array; and
a receiver circuit, configured to receive a first data strobe signal and a second data strobe signal from a memory controller, wherein the receiver circuit comprises:
a differential amplifier, configured to amplify the first data strobe signal and the second data strobe signal to generate a third data strobe signal and a fourth data strobe signal;
an auxiliary control circuit, configured to generate a disable control signal using the first data strobe signal and the second data strobe signal; and
a data strobe control circuit, configured to generate a first output data strobe signal and a second output data strobe signal according to the disable control signal, the third data strobe signal, and the fourth data strobe signal;
wherein in response to the first data strobe signal and the second data strobe signal satisfying a first condition, the disable control signal generated by the auxiliary control circuit is in a high logic state;
wherein in response to the first data strobe signal and the second data strobe signal not satisfying the first condition, the disable control signal generated by the auxiliary control circuit is in a low logic state;
wherein in response to the disable control signal being in the low logic state, the data strobe control circuit is activated to generate the first output data strobe signal and the second output data strobe signal using the third data strobe signal and the fourth data strobe signal.

2. The memory device of claim 1, wherein the first condition indicates that the first data strobe signal and the second data strobe signal are in the low logic state.

3. The memory device of claim 2, wherein in response to the disable control signal being in the high logic state, the data strobe control circuit is disabled, and the first output data strobe signal and the second output data strobe signal generated by the data strobe control circuit are kept in the low logic state.

4. The memory device of claim 3, wherein the auxiliary control circuit comprises:
a first transistor, having a gate electrically connected to the first data strobe signal, a drain electrically connected to a first node, and a source electrically connected to a second node;
a second transistor, having a gate electrically connected to the second data strobe signal, a drain electrically connected to the first node, and a source electrically connected to the second node;
a third transistor, having a gate electrically connected to the first data strobe signal, a drain electrically connected to a third node, and a source being grounded;
a fourth transistor, having a gate electrically connected to the second data strobe signal, a drain electrically connected to the third node, and a source being grounded;
a first resistor, coupled between the second node and the third node; and
a second resistor, coupled between a power supply voltage and the first node,
wherein the disable control signal is generated at the second node.

5. The memory device of claim 4, wherein a first resistance of the first resistor is lower than a second resistance of the second resistor.

6. The memory device of claim 5, wherein when the first transistor, the second transistor, the third transistor, and the fourth transistor have the first resistance and the second resistance in a turn-on state and a turn-off state, respectively, and the second resistance is much higher than the first resistance.

7. The memory device of claim 6, wherein the first resistance and the second resistance refer to a first drain-source resistance and a second drain-source resistance of the first transistor, the second transistor, the third transistor, and the fourth transistor in the turn-on state and the turn-off state, respectively.

8. The memory device of claim 6, wherein in response to the first data strobe signal and the second data strobe signal being equal to half of the power supply voltage, the first transistor, the second transistor, the third transistor, and the fourth transistor have the first resistance in the turn-on state.

9. The memory device of claim 8, wherein the disable control signal is in the low logic state when the first transistor, the second transistor, the third transistor, and the fourth transistor are in the turn-on state.

10. A memory device, comprising:
a memory cell array;
a control circuit, configured to control data access of the memory cell array; and
a receiver circuit, configured to receive a first data strobe signal and a second data strobe signal from a memory controller, wherein the receiver circuit comprises:
a differential amplifier, configured to amplify the first data strobe signal and the second data strobe signal to generate a third data strobe signal and a fourth data strobe signal;
an auxiliary control circuit, configured to generate a disable control signal using a fifth data strobe signal and a sixth data strobe signal generated from the first data strobe signal and the second data strobe signal, respectively; and
a data strobe control circuit, configured to generate a first output data strobe signal and a second output data strobe signal according to the disable control signal, the third data strobe signal, and the fourth data strobe signal;
wherein in response to the first data strobe signal and the second data strobe signal satisfying a first condition, the disable control signal generated by the auxiliary control circuit is in a high logic state;
wherein the first condition indicates that the first data strobe signal and the second data strobe signal are in a low logic state;
wherein in response to the disable control signal being in the high logic state, the data strobe control circuit is disabled, and the first output data strobe signal and the second output data strobe signal are kept in the low logic state.

11. The memory device of claim 10, wherein the auxiliary control circuit comprises:
a first amplifier, configured to amplify the first data strobe signal to generate a first amplified data strobe signal;
a second amplifier, configured to amplify the second data strobe signal to generate a second amplified data strobe signal;
a first transistor, having a gate electrically connected to the first amplified data strobe signal, a drain electrically connected to a first node, and a source electrically connected to a second node;
a second transistor, having a gate electrically connected to the second amplified data strobe signal, a drain electrically connected to the first node, and a source electrically connected to the second node;

a third transistor, having a gate electrically connected to the first data strobe signal, a drain electrically connected to a third node, and a source being grounded;

a fourth transistor, having a gate electrically connected to the second data strobe signal, a drain electrically connected to the third node, and a source being grounded;

a first resistor, coupled between the second node and the third node; and a second resistor, coupled between a power supply voltage and the first node, wherein the disable control signal is generated at the second node.

12. The memory device of claim 11, wherein a first resistance of the first resistor is lower than a second resistance of the second resistor.

13. The memory device of claim 11, wherein an amplitude of the first amplified data strobe signal and the second amplified data strobe signal is higher than a threshold voltage of the first transistor, the second transistor, the third transistor, and the fourth transistor.

14. The memory device of claim 11, wherein when the first transistor, the second transistor, the third transistor, and the fourth transistor have a first resistance and a second resistance in a turn-on state and a turn-off state, respectively, and the second resistance is much higher than the first resistance.

* * * * *